United States Patent [19]
Andronaco

[11] Patent Number: 5,944,359
[45] Date of Patent: Aug. 31, 1999

[54] FLANGELESS PIPING SYSTEM FOR LINED PIPE

[75] Inventor: Ronald V. Andronaco, Alto, Mich.

[73] Assignee: Pureflex Inc., Kentwood, Mich.

[21] Appl. No.: 08/854,415

[22] Filed: May 12, 1997

[51] Int. Cl.[6] .................................................. F16L 9/14
[52] U.S. Cl. ..................... 285/55; 285/256; 285/222.4; 285/397
[58] Field of Search .................. 285/65, 222.1, 285/256, 397, 370, 222.2, 222.4, 382

[56] References Cited

U.S. PATENT DOCUMENTS

| | | | |
|---|---|---|---|
| 3,335,758 | 8/1967 | Bertolet, Jr. | 285/55 X |
| 3,499,666 | 3/1970 | Turner | 285/55 |
| 4,293,150 | 10/1981 | Press | 285/222.4 |
| 4,366,841 | 1/1983 | Currie et al. | 285/222.2 |
| 4,367,889 | 1/1983 | Redl | 285/222.2 |
| 4,726,612 | 2/1988 | Picton | 285/256 |
| 5,348,779 | 9/1994 | Igarashi | 285/55 X |
| 5,566,984 | 10/1996 | Abbema et al. | 285/55 X |

FOREIGN PATENT DOCUMENTS

| | | | |
|---|---|---|---|
| 43707 | 7/1937 | France | 285/256 |

*Primary Examiner*—Lynne Reichard
*Assistant Examiner*—David E. Bochna
*Attorney, Agent, or Firm*—Young & Basile, P.C.

[57] ABSTRACT

An apparatus for joining at least one longitudinal end of a pipe to a member having a longitudinally extending aperture therethrough includes a unitary, one-piece, elongated body with structure responsive to a crimping operation for lockingly and sealingly engaging with an inner surface of the pipe. The lockingly and sealingly engaging structure can include a reduced diameter portion engagable within the longitudinal end of the pipe and having at least two radially outwardly extending annular ridges or teeth formed on the reduced diameter portion. For lined pipe, the engaging structure can also include a ribbed or barbed portion extending longitudinally outwardly from the reduced diameter portion for sealingly engaging the lining between the ribbed portion and the inner surface of the pipe in response to the crimping operation.

20 Claims, 2 Drawing Sheets

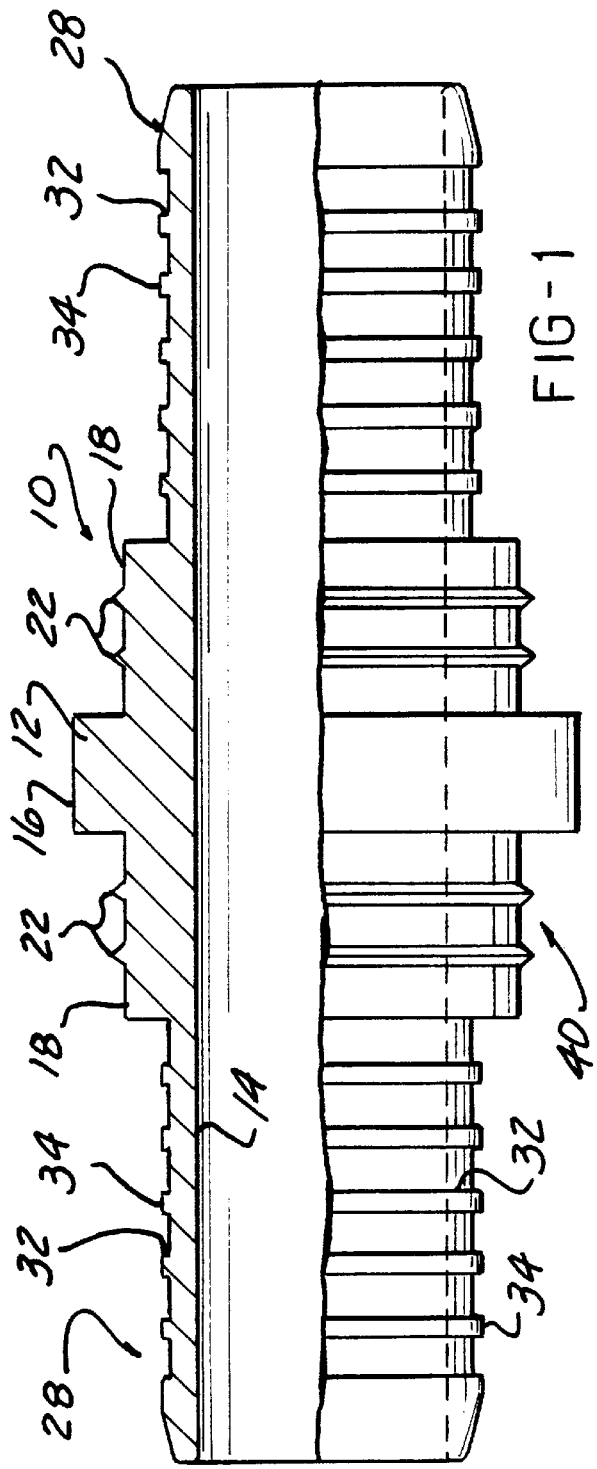
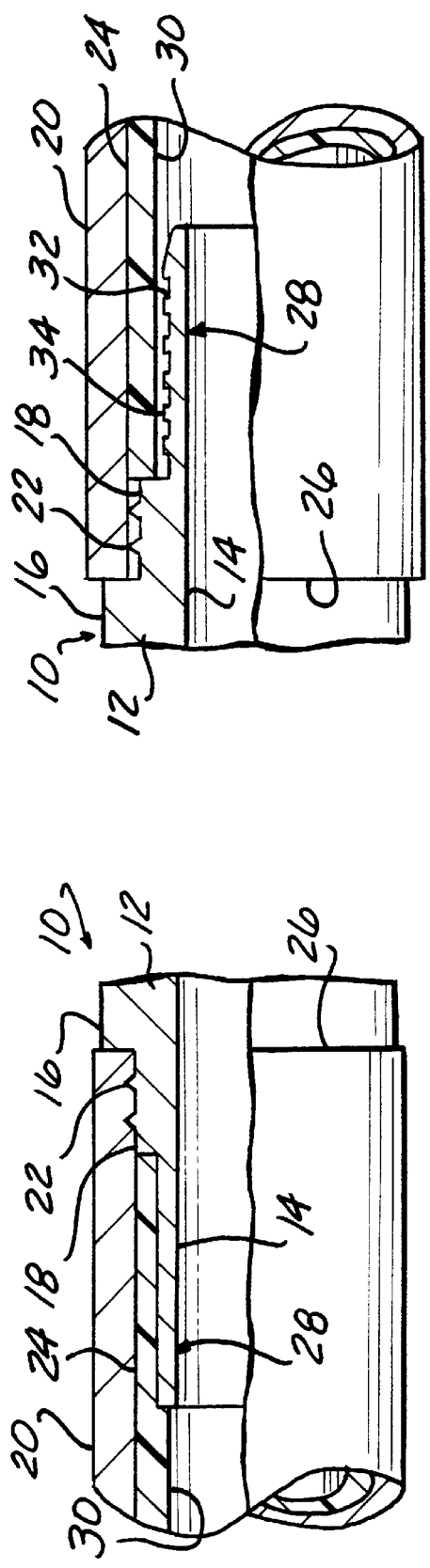
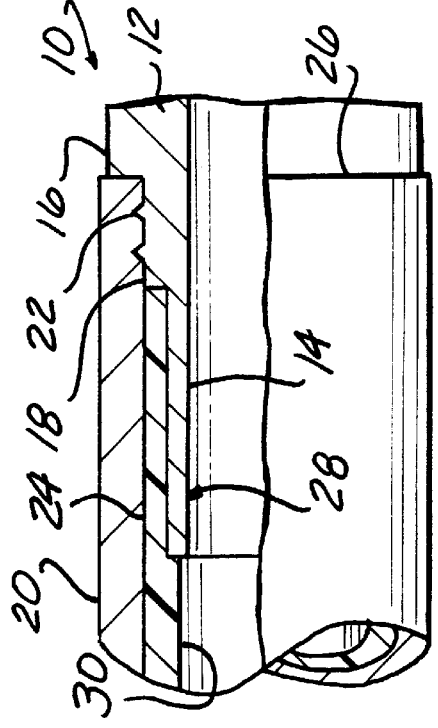

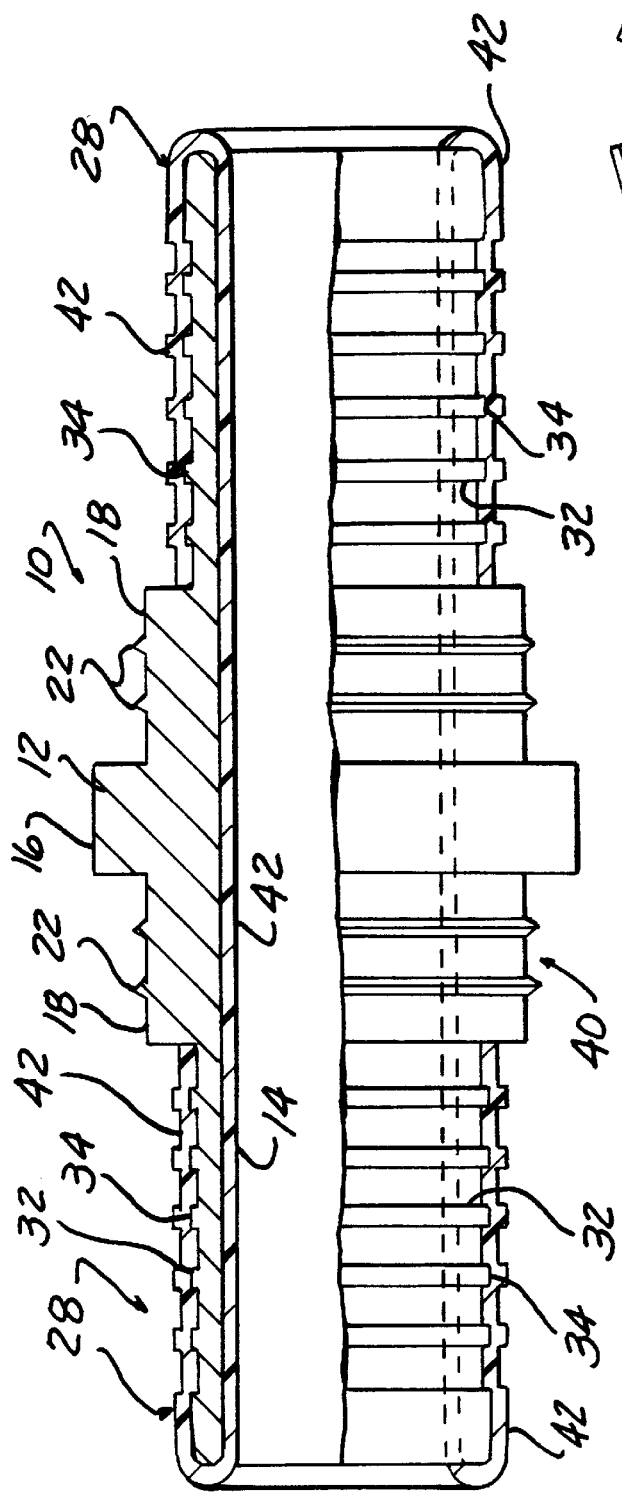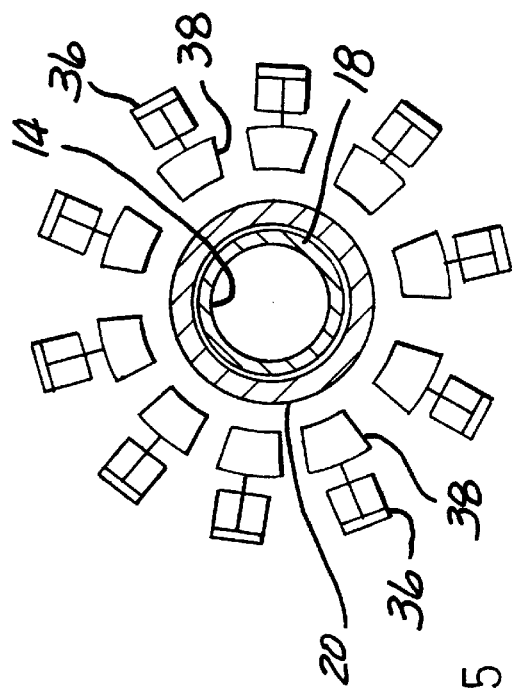

FLANGELESS PIPING SYSTEM FOR LINED PIPE

FIELD OF THE INVENTION

The present invention relates to an apparatus and method for joining individual sections of lined pipe in a leak-free manner without flanges.

BACKGROUND OF THE INVENTION

Currently, it is common to connect lined piping with flange connections having seals interposed between adjacent flanges to prevent leaking through the joint. In some instances, such as piping lined with teflon, the teflon lining can act as a sealing member when flared outwardly at the end of the pipe section between the flange pieces. Sealing flanged teflon lined piping in this manner can result in the need for periodic tightening of the flange joints, since teflon is subject to "cold flowing" when held under pressure and subjected to temperature cycling. In addition, these types of sealed flanged fittings for pipeline systems can create various associated problems when carrying flammable fluids, since the sealed joint between the flanges is the first area to fail when subject to any type of fire or high heat hazardous condition. Other explosive hazards are associated with teflon lined piping, since static charges can build up as a result of flammable or explosive fluids carried within the teflon coated piping. To dissipate the electrical charge, it has been known to provide a metal plate extending between the flanges to provide a conductor in order to ground the electrical charge capable of being built up within the teflon coated tubing during fluid flow. Currently, it can take approximately one hour to prepare stainless or steel piping with a teflon lining for connection with a flanged joint. Additional labor required for joint preparation greatly increases the cost of installing a piping system of this type.

SUMMARY OF THE INVENTION

Therefore, it would be desirable in the present invention to provide an apparatus and method for preparing and installing joints in a lined pipeline without flanges. It is desirable in the present invention to provide an apparatus and method for joining individual pipe sections with reduced labor and associated cost, without adversely effecting the sealing properties of the joint or the performance of the finished pipeline system. In addition, it would be desirable to provide an apparatus and method for joining pipe sections that would increase the fire safety and decrease chemical emissions of the finished joint. It would further be desirable to provide an apparatus and method to produce a joint for lined pipe that when connected would exceed the pressure rating of a comparable flanged connection.

According to the present invention, an apparatus and method of joining individual sections of pipe includes a single, unitary, one-piece member or coupling. Preferably, the pipe to be joined is metallic and can include an internal lining material. The joining member, or coupling, preferably is made of a metallic material, and can be encapsulated with a lining material disposed over all, or preferably at least a portion of the external periphery of the coupling, if desired. The joining member has an enlarged annular shoulder adjacent an end or a mid portion of the member. The external periphery of the enlarged shoulder has a diameter slightly less than the outside diameter of the piping to be connected. A reduced diameter portion extends outwardly from the enlarged shoulder portion, and defines an elongated passageway extending through the reduced diameter portion and the enlarged annular shoulder portion. The reduced diameter portion is engagable within the inside diameter of the pipe to be joined. The reduced diameter portion of the joining member has an external surface with at least two radially outwardly extending angular ridges or teeth. Preferably, each annual ridge or tooth is of sufficient dimension to lockingly engage and seal with respect to the inner surface of the pipe to be joined when the pipe to be joined is crimped inwardly toward the reduced diameter portion of the joining member. Preferably, each tooth or ridge has a sharp outer edge to piercingly engage with respect to the inner surface of the pipe to be joined. Preferably, two or more annular ridges or teeth are provided on the external surface of the reduced diameter portion of the joining member. When crimping the pipe to be joined with respect to the joining member, the outer periphery of the enlarged annular shoulder acts as a stop to control the degree of inward compression or crimping of the outer pipe to be joined with respect to the joining member. A second reduced diameter portion can extend outwardly in an opposite longitudinal direction with respect to the first reduced diameter portion on an opposite side of the enlarged annular shoulder. The structural configuration and operation of the second reduced diameter portion is similar in all respects to the first reduced diameter portion, except for being a mirror image thereof.

When joining lined pipe systems, the joining member according to the present invention can also include a ribbed or barbed portion of reduced diameter extending longitudinally outwardly from the first and second reduced diameter portions. The ribbed or barbed portion is adapted to engage the lining of the pipe system between the ribbed portion and the inner surface of the pipe to be joined. Crimping the outer pipe to be joined onto the joining member results in the lining material deforming and sealingly engaging with respect to the radially outwardly extending surfaces of the rib or barb formed on the external surface of the ribbed or barbed portion of the joining member. If desired, the longitudinally extending passageway through the joining member, and the external surface of the ribbed or barbed portion, can be encapsulated with a material compatible with the lining material of the piping system to protect the joining member.

To join two longitudinal ends of a piping system to one another using the joining member according to the present invention, each longitudinal end of the pipe is inserted until the end of the pipe abuts against the radially extending wall of the enlarged shoulder portion of the joining member. This positions the reduced diameter portions of the joining member within the interior of the longitudinal ends of the piping to be joined. Radially inward crimping pressure is then applied to the external periphery of one end, or preferably to both longitudinal ends of the pipe spanning across the joining member to simultaneously crimp both longitudinal ends of the pipes to the external surface of the reduced diameter portion of the joining member. The crimping action causes the annular teeth to bitingly engage and lock with respect to the inner surface of the crimped pipes. In the case of a lined pipe, as previously described, the lining material deforms during the crimping operation to sealing engage the ribbed or barbed portion of the joining member.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a partial cross sectional view of a joining member according to the present invention;

FIG. 2 is a partial cross sectional view of an encapsulated joining member according to the present invention;

FIG. 3 is a partial cross sectional view of a joining member inserted within a longitudinal end of a lined pipe prior to crimping;

FIG. 4 is a partial cross sectional view of the joining member connected to a longitudinal end of a lined pipe after crimping; and FIG. 5 is a partial cross sectional view of a joining member inserted within a longitudinal end of a pipe prior to crimping, with the crimping apparatus shown schematically around the external periphery of the pipe and joining member.

DESCRIPTION OF THE PREFERRED EMBODIMENT

A joining member 10 according to the present invention is illustrated in FIGS. 1–5. The joining member 10 includes a unitary, one-piece, body 12 elongated in the longitudinal direction. The body 12 defines an internal passageway 14 allowing fluid flow through the piping system after connection of the piping segments to be joined. The illustrated embodiment discloses a straight-flow through configuration or coupling member, and it should be recognized that the present invention can be modified to include angled configurations, by way of example and not limitation, 45 degree connectors, 90 degree connectors, Y connectors, T connectors, or the like. For any structural configuration of the coupling, fitting or the like, each joining member preferably includes an enlarged annular shoulder 16 and a longitudinally outwardly extending reduced diameter portion 18 projecting from the enlarged annular shoulder 16. The external periphery of the enlarged annular shoulder 16 has a diameter slightly less than an outside diameter of the piping 20 to be connected. The reduced diameter portion 18 extends outwardly from the enlarged shoulder portion 16 and is engageable within an inside diameter of the pipe 20 to be joined. Preferably, the passageway 14 extends through the reduced diameter portion 18 and the enlarged annular shoulder portion 16.

The reduced diameter portion 18 has an external surface with at least two radially outwardly extending annular ridges or teeth 22. Preferably, each annular ridge or tooth 22 is of sufficient dimension radially and longitudinally to lockingly engage and seal with respect to the inner surface 24 of the pipe 20 to be joined when the pipe 20 is crimped inwardly toward the reduced diameter portion 18 of the joining member 10. Each tooth or ridge 22 preferably includes a relatively sharp outer edge sufficient to piercingly engage with respect to the inner surface 24 of the pipe 20 to be joined. Two or more annular ridges or teeth 22 are preferably provided on the external surface of the reduced diameter portion 18 of the joining member 10 in order to provide a strong, sealed joint between the joining member 10 and the pipe 20 after crimping.

When the pipe 20 is crimped radially inwardly with respect to the joining member 10, and specifically the reduced diameter portion 18 of the joining member 10, the outer periphery of the enlarged annular shoulder 16 can act as a stop to control the degree of inward compression or crimping of the outer pipe 20 with respect to the joining member 10. It should be recognized that the enlarged annular shoulder 16 also acts as a stop to visually ensure adequate insertion of the reduced diameter portion 18 within the inner diameter of the pipe 20 prior to crimping, since the longitudinal end 26 of the pipe 20 can be brought into abutting engagement with the enlarged annular shoulder 16 prior to crimping. If other means are provided for ensuring sufficient longitudinal insertion of the reduced diameter portion 18 within the inner periphery of the pipe 20, and for preventing over compression or crimping of the outer pipe 20 with respect to the joining member 10, the enlarged annular shoulder 16 can made be considered optional without departing from the spirit and scope of the present invention.

In addition, the joining member 10 according to the present invention can include at least one reduced diameter portion 18 engagable within the inner diameter of the pipe 20, and preferably includes first and second reduced diameter portions 18 extending outwardly on opposite longitudinal ends of the joining member 10 for insertion within longitudinal ends of two pipes 20 to be joined with respect to one another. The structural configurations and operation of the second reduced diameter portion is similar in all respects to the first reduced diameter portion described herein except for being a mirror image thereof. Therefore, in its simplest form the present invention can take the form of that illustrated in FIG. 3 in the uncrimped position and FIG. 4 in the crimped position, and preferably includes the first and second reduced diameter portions 18 as illustrated in FIG. 1 for a straight flow through fitting or coupling configuration. The fitting illustrated in FIGS. 1–5 can be used for joining lined metallic pipe. The joining member 10 according to the present invention is preferably also made of metallic material. The metallic material used for the pipe 20 and the joining member 10 can be of the same metallic material, or can be of different metallic materials. By way of example and not limitation, the pipe 20 and/or the joining member 10 can be made of a material selected from the group including Stainless Steel, Hastalloy-C, Titanium, and Teflon Encapsulated Stainless Steel.

Referring now to FIGS. 1–4, a joining member 10 according to the present invention for joining lined pipe 20 can include a ribbed or barbed portion 28 of a smaller reduced diameter with respect to the reduced diameter portion 18. The ribbed or barbed portion 28 extends longitudinally outwardly from the reduced diameter portion 18 and is adapted to engage the lining 30 of the pipe 20 with the lining 30 interposed between the ribbed portion 28 and the inner surface 24 of the pipe 20 to be joined. During the crimping operation of the outer pipe 20 radially inwardly into locking and sealed engagement with the joining member 10, the lining 30 deforms and sealingly engages with respect to the radially outwardly extending surfaces 32 of the ribs or barbs 34 formed on the external surface of the ribbed or barbed portion 28 of the joining member 10. Depending on the material to be conveyed through the piping system, the longitudinally extending passageway 14 through the joining member 10, and at least a portion of the external surface can be encapsulated with a layer 42 of protective material compatible with the lining 30 of the pipe 20 to protect the joining member 10. Preferably, the material encapsulating at least a portion of the joining member 10 extends along the external surface of the ribbed or barbed portion 28 as illustrated in FIG. 2, such that the reduced diameter portion 18 and the annular ridges or teeth formed thereon are free of the encapsulation material. It is believed that this provides a stronger locking and sealing engagement of the annular ridges or teeth 22 into the internal surface 24 of the pipe 20 during the crimping operation. The encapsulation material and the lining material of the pipe can be the same material, or can be different materials. By way of example and not limitation, the lining and/or the encapsulation material can be selected from a group including Teflon, Kynar, Polypropelene, and Teflon Encapsulated. In the configuration illustrated in FIG. 2, the lining 30 on the outside of the joining member 10 creates a seal between the inner surface 24 of the pipe 20 and the ribbed or barbed portion 28 of the joining member 10 providing a continuous layer of lining from the joining member 10 to the pipe 20. The present invention is particularly well adapted for use in Teflon lined steel pipe. As previously described, Teflon is capable of "cold flowing" when bolted together during hot and cold cycling, which can result in leaks occurring in previously known flanged piping systems. To resolve this problem with flanged piping systems, periodic retightening of the bolts holding the flanged system together was required. The flanged system also required approximately one hour to fabricate and assembly a single flanged joint. The present invention eliminates the problem associated with "cold flowing" of Teflon lining material between flanges, and reduces the time for fabrication and assembly of a joint to approximately five minutes. In addition, the joining member 10 according to the present invention is inherently fire safe, since the exposed Teflon seal of a flanged connection is eliminated with the present invention. The present configuration also eliminates "fugitive emissions" or gases leaking out of the piping system, which is a common problem in a flanged piping systems.

By way of example and not limitation, in a flanged piping system rated for 150 pounds of pressure, any leaks normally occur at the flange joint. The present invention of a machined component, such as joining member 10, is inserted between two Teflon lined stainless steel pipes. While conducting a static pressure test after the pipe 20 had been crimped onto the joining member 10, the present invention was capable of withstanding 4,000 pounds of pressure prior to exhibiting any visual leaking of material from the joint formed by the present invention. When the same test was conducted on stainless steel piping without a teflon lining, the joining member 10 according to the present invention was capable of withstanding 3,200 pounds of pressure before any sign of visible leaking from the joint was observed. It is believed that the present invention can be used on piping sizes greater than one half inch diameter. In addition it is believed that the preferred range of piping size is no greater than a 4 inch diameter pipe. In preparing the test components described above, the machined component was made of 1.315 inch diameter stainless steel with an enlarged annular shoulder of 1.205 inch diameter, a reduced portion of 0.945 inch diameter with two longitudinally spaced teeth. Each tooth had an overall height of 0.030 inches and an overall width at the base of 0.035 inches. It is believed that the specific dimensions of the locking and sealing teeth 22 on the reduced diameter portion 18 will vary in dimension and spacing depending on the size of pipe to be joined. Therefore, the above examples were manufactured for testing purposes and are given for purposes of illustration, rather than limitation.

Referring to FIGS. 3–5, a connection of pipe 20 to the joining member 10 will be described in greater detail In order to join two longitudinal ends of pipe 20 to one another using the joining member 10 according to the present invention, each longitudinal end 26 of the pipe 20 is inserted until the end 26 of the pipe 20 abuts against the radially extending wall of the enlarged shoulder portion 16 of the joining member 10. This positions the reduced diameter portion 18 of the joining member 10 within the interior of the longitudinal end 26 of the pipe 20 to be joined. As illustrated in FIGS. 3 and 4, this also positions the ribbed or barbed portion 28 with the lining 30 sandwiched or interposed between the barbed portion 28 and the inner surface 24 of the pipe 20. The joining member 10 and pipe 20 are then positioned within a crimping apparatus, such as that schematically illustrated in FIG. 5. Radially inward crimping pressure is generated by hydraulic cylinders 36, or any other suitable pressure generating means, to drive arcuate anvil segments 38 radially inwardly to engage the external periphery of one end portion, or both longitudinal end portions of the pipe 20 spanning across the joining member 10, to crimp one or both longitudinal ends of the pipe 20 to the external surface of the reduced diameter portion 18 of the joining member 10. The crimping action causes the annular teeth 22 to bitingly engage and lock with respect to the inner surface 24 of the crimped pipes 20. In the case of a lined pipe as illustrated in FIGS. 3 and 4, the lining material deforms during the crimping operation, as can be seen by comparing the uncrimped configuration of FIG. 3 with the crimped configuration of FIG. 4, to sealing engage the ribbed or barbed portion 28 with respect to the inner surface 24 of the pipe 20 to create a flangeless pipe system having superior leak resistance, superior fire safety, superior resistance to fugitive chemical emissions, and efficient assembly in less time than required to prepare a similar flanged joint for the same size of lined pipe.

The present invention provides a fitting for sealing the pipe from the "inside-out", rather than from the "outside-in" as is typical in a flanged connection. The reduced diameter portion 18 in combination with at least two radially outwardly extending annular ridges or teeth 22 defines means 40 for lockingly and sealingly engaging an inner surface 24 of a pipe 20 with respect to a joining member 10 in response to a crimping operation applied to an external surface of the pipe 20.

An apparatus for joining at least one longitudinal end of a pipe to a member having a longitudinally extending aperture therethrough includes a unitary, one-piece, elongated body with means responsive to a crimping operation for lockingly and sealingly engaging with an inner surface of the pipe. The means for lockingly and sealingly engaging can include a reduced diameter portion engagable within the longitudinal end of the pipe and having at least two radially outwardly extending annular ridges or teeth formed on the reduced diameter portion. For lined pipe, the means for lockingly and sealingly engaging can also include a ribbed or barbed portion extending longitudinally outwardly from the reduced diameter portion for sealingly engaging the lining between the ribbed portion and the inner surface of the pipe in response to the crimping operation.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A flangeless metal piping system for a metal pipe having an inner surface comprising:

a unitary, one-piece, elongated metal body;

means, responsive to a crimping operation, for lockingly and sealingly engaging with the inner surface of the metal pipe, said engaging means formed on said metal body; and stop means, formed on said metal body, for limiting radially inward movement of said metal pipe during said crimping operation, wherein said stop means includes said metal body having an enlarged shoulder with an outer dimension less than an outer dimension of said metal pipe.

2. The system of claim 1 wherein said means for lockingly and sealingly engaging further comprises:
a reduced diameter portion engagable within a longitudinal end of the metal pipe.

3. The system of claim 2 further comprising:
said reduced diameter portion having a radially outwardly extending annular ridge formed on the reduced diameter portion engageable with said inner surface of said metal pipe.

4. The system of claim 3 further comprising:
said annular ridge piercingly engaging said inner surface of said metal pipe in response to said crimping operation.

5. The system of claim 2 wherein said pipe is lined and said means for lockingly and sealingly engaging further comprises:
a ribbed portion extending longitudinally outwardly from the reduced diameter portion for sealingly engaging the lining between the ribbed portion and the inner surface of the metal pipe in response to the crimping operation.

6. The system of claim 1 further comprising:
said metal body having a longitudinally extending aperture extending therethrough.

7. The system of claim 1 further comprising:
lining means, covering at least a portion of the metal body, for protecting the metal body from fluids carried in said metal pipe.

8. The system of claim 1 wherein the metal body is selected from a group of materials consisting of Stainless Steel, Teflon Encapsulated Stainless Steel, Hastalloy-C, and Titanium.

9. The system of claim 1 wherein the metal pipe is selected from a group of materials consisting of Stainless Steel, Teflon Encapsulated Stainless Steel, Hastalloy-C, and Titanium.

10. A metal flangeless fluid conduit connection for a metal fluid conduit having an inner surface comprising:
a unitary, one-piece, elongated metal body;
means for lockingly and sealingly engaging with the inner surface of the metal fluid conduit, said engaging means formed on a portion of said metal body engageable within a longitudinal end of said metal fluid conduit, and responsive to a crimping operation to lock and seal with respect to said inner surface of said metal fluid conduit; and
stop means, formed on said metal body, for limiting radially inward movement of said metal fluid conduit during said crimping operation, wherein said stop means includes said metal body having an enlarged shoulder with an outer dimension less than an outer dimension of said metal fluid conduit.

11. The metal flangeless fluid conduit connection of claim 10 further comprising:
a reduced diameter portion having a radially outwardly extending annular ridge formed on the reduced diameter portion engageable with said inner surface of said metal fluid conduit.

12. The metal flangeless fluid conduit connection of claim 11 further comprising:
said annular ridge piercingly engaging said inner surface of said metal fluid conduit in response to said crimping operation.

13. The metal flangeless fluid conduit connection of claim 10 wherein said metal fluid conduit is lined and said means for lockingly and sealingly engaging further comprises:
a ribbed portion extending longitudinally outwardly from the metal body for sealingly engaging the lining between the ribbed portion and the inner surface of the metal fluid conduit in response to the crimping operation.

14. The metal flangeless fluid conduit connection of claim 10 further comprising:
said metal body having a longitudinally extending aperture extending therethrough in fluid communication with said inner surface of said metal fluid conduit.

15. The metal flangeless fluid conduit connection of claim 10 further comprising:
lining means, covering at least a portion of the metal body, for protecting the metal body from fluids carried in said metal fluid conduit.

16. The metal flangeless fluid conduit connection of claim 15 wherein said lining means further comprises:
at least one layer of material extending along a substantial longitudinal length of said metal body excluding said engaging means.

17. The metal flangeless fluid conduit connection of claim 10 assembled to form a metal flangeless piping system according to a method comprising the steps of:
inserting a portion of said metal body within a longitudinal end of the metal pipe;
limiting radially inward movement of said metal pipe daring said crimping operation with stop means formed on said metal body, wherein said stop means includes said metal body having an enlarged shoulder with an outer dimension less than an outer dimension of said metal pipe; and
crimping the longitudinal end of the metal pipe radially inward into locking and sealing engagement with said engaging means formed on said metal body.

18. The metal flangeless fluid conduit connection of claim 10 wherein the metal body is selected from a group of materials consisting of Stainless Steel, Teflon Encapsulated Stainless Steel, Hastalloy-C, and Titanium.

19. The metal flangeless fluid conduit connection of claim 10 wherein the metal fluid conduit is selected from a group of materials consisting of Stainless Steel, Teflon Encapsulated Stainless Steel, Hastalloy-C, and Titanium.

20. A method for assembling of a metal flangeless piping system having a metal pipe with an inner surface comprising the steps of:
providing a metal flangeless fluid conduit connector having a unitary, one-piece, elongated metal body, and means for lockingly and sealingly engaging with the inner surface of the metal pipe, said engaging means formed on said metal body and responsive to a crimping operation;
inserting a portion of said metal body within a longitudinal end of the metal pipe;
limiting radially inward movement of said metal pipe during said crimping operation with stop means formed on said metal body, wherein said stop means includes said metal body having an enlarged shoulder with an outer dimension less than an outer dimension of said metal pipe; and
crimping the longitudinal end of the metal pipe radially inward into locking and sealing engagement with said engaging means formed on said metal body.

* * * * *